(12) United States Patent
Morin et al.

(10) Patent No.: US 6,685,902 B2
(45) Date of Patent: Feb. 3, 2004

(54) PROCEDURE AND APPARATUS FOR THE CLEANING OF FLUE GASES CONTAINING SULFUR DIOXIDE

(75) Inventors: Jean X. Morin, Marchandon (FR); Joachim Seeber, Wernau (DE)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 09/952,749

(22) Filed: Sep. 14, 2001

(65) Prior Publication Data

US 2002/0085961 A1 Jul. 4, 2002

(30) Foreign Application Priority Data

Sep. 15, 2000 (DE) .......................... 100 45 586

(51) Int. Cl.[7] .............................. B01D 53/50
(52) U.S. Cl. ..................... 423/244.01; 423/244.07; 423/244.08; 423/555; 423/640
(58) Field of Search .............. 423/244.01, 244.07, 423/244.08, 555, 640

(56) References Cited

U.S. PATENT DOCUMENTS

| | | | |
|---|---|---|---|
| 3,976,747 A | * | 8/1976 | Shale et al. ............... 423/244 |
| 4,312,280 A | * | 1/1982 | Shearer et al. ............ 110/347 |
| 4,464,353 A | * | 8/1984 | Hains ........................ 423/640 |
| 4,867,955 A | * | 9/1989 | Johnson ..................... 423/244 |
| 4,915,920 A | * | 4/1990 | Kobayashi ................. 423/239 |
| 5,006,323 A | * | 4/1991 | Johnson ..................... 423/244 |

FOREIGN PATENT DOCUMENTS

WO        WO 99/58226 A1  *  11/1999

* cited by examiner

Primary Examiner—Stanley S. Silverman
Assistant Examiner—Timothy C. Vanoy
(74) Attorney, Agent, or Firm—Alix, Yale & Ristas, LLP

(57) ABSTRACT

A process for cleaning flue gases containing ash and sulfur dioxide produced by burning sulfur-containing coal in the combustion chamber of a circulating fluidized-bed firing system includes delivering a particulate $SO_2$ sorbent into the combustion chamber. A mixture including portions of the ash, the reaction product produced in the reaction of the $SO_2$ sorbent with the sulfur dioxide, and unreacted $SO_2$ sorbent is fed from the combustion chamber to a mixing unit. In the mixing unit, water or an aqueous sodium-containing solution is mixed with this mixture and the unreacted $SO_2$ sorbent is converted into a hydration product (for example $Ca(OH)_2$) at a reaction temperature of 60° to 100° and at atmospheric pressure. The ash, the reaction product, and the hydration product is returned from the mixing unit into the combustion chamber, and the hydration product is reactivated to an $SO_2$ sorbent at a combustion-chamber temperature of 700° to 950° C.

22 Claims, 2 Drawing Sheets

PROCEDURE AND APPARATUS FOR THE CLEANING OF FLUE GASES CONTAINING SULFUR DIOXIDE

BACKGROUND OF THE INVENTION

This invention relates to a procedure as well as an apparatus for the cleaning of flue gases containing sulfur dioxide that come from circulating fluidized-bed firing systems.

Circulating fluidized-bed firing systems are used in particular for the low-emission combustion of fossil fuels, e.g. coal, peat, wood, and so forth. In burning sulfur-containing coal, for example, the oxidation of the sulfur produces sulfur dioxide, which gets into the atmosphere via the flue gas. These emissions, which are harmful to the earth's atmosphere, are returned to the earth as acid rain by way of the weather cycle. Various procedures have been developed for reducing these harmful emissions to the greatest possible extent.

An overview of the retaining of sulfur dioxide in fluidized-bed firing systems was presented by E. J. Anthony during the "Mediterranean Combustion Symposium" in Antalya, Turkey in June 1999.

For example, a familiar procedure is the addition of a fine-grained alkaline $SO_2$ sorbent, generally limestone ($CaCO_3$), burnt lime (CaO) or also dolomite, into the combustion chamber of the fluidized-bed firing system. Here, first of all the roasting (calcining process) of the limestone to burnt lime (CaO) takes place, and subsequently a reaction occurs between the roasted limestone and the sulfur dioxide of the flue gas.

If in this connection the limestone is exposed to the temperatures of 700° C. to 950° C. that are present in a circulating fluidized-bed firing system, namely if carbon dioxide is driven off from the limestone, then what remains is burnt lime, which because of the driving off of the $CO_2$ has a high degree of porosity and thus a high specific surface area.

The subsequent gas-solid reaction of the burnt lime (sorbent) with sulfur dioxide and oxygen is a surface reaction, and this is why the creation of a high specific surface area is a fundamental prerequisite for this reaction. Remaining behind as a solid reaction product is calcium sulfate or gypsum ($CaSO_4$), which stays in the pores or on the surface of the sorbent or the burnt lime.

Depending on the grain size of the limestone or $SO_2$ sorbent used and on its abrasion properties, either the aggregate of the sorbent-reaction product (lime-gypsum aggregate) remains long enough in the combustion chamber for it to be drawn off via the components of the combustion-chamber ash removal system, or in the case of small particles the sorbent-reaction product aggregate leaves the combustion chamber together with the flue-gas stream and is subsequently separated out in the following flue-gas filter.

The mixture composed of fuel ash, reaction product, and free, unreacted sorbent that is drawn off via the combustion-chamber ash removal system is generally referred to as bottom ash or coarse ash. The particle size of this coarse ash is for the most part larger than 100 µm. The maximum grain diameter can amount to several mm.

The ash carried off with the flue gas that is subsequently separated out in the filter is generally called filter ash. Depending on the quality of the cyclone/separator, the grain size of this ash encompasses the small grain fractions up to about 200 µm in diameter.

From knowledge gained by constructing fluidized-bed firing systems, it is evident that for the degree of desulfurization required in industrial use, namely a reduction in sulfur dioxide of from 70% to 99%, the desulfurization reaction requires a high excess of sorbent. This requirement is all the higher the greater is the demand placed on the degree of desulfurization.

If one uses the Ca/S ratio as a measure for the added limestone or another sorbent, namely the molar quotient of externally supplied Ca and the total sulfur of the fuel that is present, then typical Ca/S values for fluidized-bed firing systems lie between 2 and 4 for a degree of desulfurization of 95%.

This requirement has economic disadvantages, in particular because in general this raises not only the operating costs for the procurement of limestone or of another sorbent, but also the waste-disposal costs for the resulting ash due to the fraction of unreacted sorbent.

In connection with the above-named desulfurization procedure for the flue gas in a circulating fluidized-bed firing system, it has proved to be a shortcoming that the limestone or the $SO_2$ sorbent does not react completely with the sulfur dioxide, since frequently a blanket of gypsum that is almost gas-impermeable forms around the lime aggregate or sorbent aggregate, and also the pores of the lime or sorbent are clogged up by gypsum as the reaction product. The physical/chemical basis for this is the larger molar volume of $SO_2$ diffusing into the lime aggregate or sorbent aggregate compared to the expelled $CO_2$.

Especially in the interior of the grains of the sorbent-reaction product (lime-gypsum grains), a core of unreacted sorbent remains that is no longer available for the reaction, since the reaction partners of sulfur dioxide and oxygen can no longer penetrate down into this core.

The concentrations of unreacted free sorbent in the ash mixture can be as much as 40%, both in the case of filter ash and also with coarse ash, relative to the total ash mixture that is to be carried off. Also, within the framework of the further use of the ash mixture in the cement industry or in roadbuilding, it is desirable to have a lower concentration of free, namely unreacted, sorbent or limestone, to below 3 to 5%.

In current fluidized-bed firing systems, various techniques are being used at present in order to increase the degree of utilization of sorbents or limestone for the purposes of reducing the sulfur dioxide.

Thus, for example, in circulating fluidized-bed firing systems the ash accumulating in the flue-gas filter, which may still contain high proportions of unreacted sorbent, is returned again directly into the combustion chamber.

One drawback of this ash recycling is that the utilization of the still free sorbent in the ash may be of only limited benefit, because the additional dwell time in the fluidized-bed combustion chamber is small and because the reactivity of this ash or of the free sorbent contained in the ash is considerably reduced compared to the original sorbent.

Moreover, a recycling of the bed ash drawn off from the combustion chamber is also customary. To this end, the bed ash is subjected in part to a treatment (sifting of the good grain fraction or grinding up of the bed ash) that is aimed at increasing its degree of reactivity. But this method as well has the drawback that its effect in reducing the requisite consumption of sorbent is very limited, since it does not eliminate the cause of the incomplete reaction, the above-mentioned gypsum blanket around the sorbent or lime aggregate.

By way of the document U.S. Pat. No. 4,312,280, Shearer et al., a system has furthermore been disclosed in which ash from stationary fluidized-bed firing systems is brought into contact with water or steam and is returned to the combustion chamber of the fluidized-bed system. The mixing of the ash with steam and water takes place in a complex fluidized-bed reactor at relatively high temperatures. No reference is made to more extensive process-technology details about operating temperatures of this fluidized-bed reactor or to what water admixtures are used for doing this work. This disclosed system has on the whole a high technological complexity and therefore has not gained much acceptance on the market, partly also because the potential market for stationary fluidized-bed firing systems is limited to small system sizes, and compared to circulating fluidized-bed firing systems they have the disadvantage of having smaller particle dwell times as well as an inhomogeneous temperature distribution.

SUMMARY OF THE INVENTION

The object of the invention, then, is to devise a procedure as well as an apparatus for the cleaning of flue gases containing sulfur dioxide that come from circulating fluidized-bed firing systems, in which the above-mentioned disadvantages are avoided. Furthermore the efficiency or the degree of utilization of the sorbent used is to be increased and thereby the quantity of sorbent needed for the sorption of the sulfur dioxide is to be reduced.

Through the achievement in accordance with the invention, a procedure as well as a mechanism are provided that have the following advantages.

By the mixing together of the ash mixture coming from the combustion chamber of the circulating fluidized-bed firing system (ash, reaction product, and unreacted $SO_2$ sorbent) with water or with an aqueous, sodium-containing solution in a mechanical mixing unit at a reaction temperature of 60° to 100° C. and at atmospheric pressure, and by recycling this into the combustion chamber of the circulating fluidized-bed firing system, the degree of utilization of the sorbent is considerably increased compared to a simple recycling of filter ash or bottom ash.

This effect arises from the fact that due to the mixing together of the ash with water or with an aqueous, sodium-containing solution in a manner corresponding the procedure in accordance with the invention, the still unreacted sorbent is first caused to react at a reaction temperature of 60 to 100° C. with water or with an aqueous, sodium-containing solution to form a hydration product. This reaction is exothermic. The elevation in temperature as well as the reaction rate depend on the concentration of the unreacted sorbent in the ash, the temperature of the supplied ash, and the temperature of the supplied water as well as on the parallel reaction with the $SiO_2$ and $Al_2O_3$ contained in the ash mixture. Since the hydration product has a lower density than the sorbent, this reaction causes the sorbent grain to "swell," so that the adsorbate blanket (or gypsum blanket) around the sorbent aggregate gets broken up.

In this connection it has turned out that the degree of conversion of the $SO_2$ sorbent into hydration product as well as the reaction rate increase considerably with increasing temperature, and within the range of about 60° C. to about 100° C. and at atmospheric pressure they reach a value that is optimally desirable in such an operation. If the temperature is too low, then the formation of hydration product proceeds only very slowly and is not complete within the dwell time that is available in the mixing unit. If the temperature is too high, then a "boiling" of the ash mixture takes place, with the consequence that due to the excess reaction enthalpy, additional water is evaporated, which is then no longer available for the hydration reaction. The consequences of reaction temperatures that are too high are an increased water consumption and problems associated with the additional vapor formation.

The reaction temperature in the mixing unit is regulated in an expedient manner in order to achieve an optimal conversion of unreacted $SO_2$ sorbent into a hydration product. This enables the dosed-out quantity of water or of sodium solution to be adjusted in accordance with the concentration of the unreacted $SO_2$ sorbent in the ash. Thus via a thermodynamic balance the optimal quantity of water to be added can be determined.

In another advantageous embodiment of the invention, the desired reaction temperature in the mixing unit is achieved by adding preheated water into the mixing unit, with the water temperature being regulated by a preheater located in front of the mixing unit. By the preheating of the water, the reaction temperature in the mixing unit can be set within the temperature range that is favorable to the course of the reaction, independently of the concentration of the non-reacted sorbent in the ash. Instead of water, an aqueous, sodium-containing solution can also be supplied.

Through the regulation of the quantity of water or of aqueous sodium-containing solution that is fed to the mixing unit, the mixture product can be carried off from the mixing unit in an advantageous manner as a function of the residual moisture. In this way, the product that is to be carried off can be produced in a desirable fashion.

In one advantageous embodiment of the invention, the dwell time of the product introduced into the mixing unit is regulated as a function of the degree of hydration of the product to be carried off. It is especially advantageous when the minimum dwell time in the mixing unit and/or the subsequent delivery lines amounts to one minute, in order to ensure that the hydration of the introduced product occurs in the desired manner.

It is expedient for the product drawn off from the mixing unit to exist in the form of a solid and to have a residual moisture less than 10%. This keeps the product drawn off from the mixing unit from being sludgy and thus difficult to transport due to a too-high excess of water.

It may be advantageous to construct the mixing unit in two stages, where in the first stage a portion of the water or of aqueous, sodium-containing solution required for the mixing is admixed with the ash, the reaction product, and the unreacted sorbent, and in the second stage the remaining portion of water or aqueous, sodium-containing solution is admixed in a regulated way as a function of the residual moisture of the product to be carried off from the mixing unit. In this way, in the first mixer attention can be directed toward the mixing process and in the second mixer it can be directed toward the requisite dwell time as well as to the temperature requirements.

By feeding the product carried off from the mixing unit into a drier, this product can be stored in an advantageous way after it has been dried. Thereby, in another advantageous embodiment of the invention the possibility is provided of putting this product into intermediate storage and feeding it to the combustion chamber after a certain interval of time.

It is further advantageous to return at least a portion of the product carried off from the mixing unit back into the mixing unit. With this measure, the dwell time for the reaction within the mixing unit can likewise be affected.

By feeding the ash mixture into a sifting/sizing unit before introducing it into the mixing unit, grain sizes of undesirable magnitude, for example larger than 300 microns, can be sifted out. This makes it possible to largely avoid erosions within the mixing unit as well as in the delivery lines. The same effect can be achieved by directing relatively large and undesirable grain sizes into a grinding unit and subsequently passing these on to the mixing unit.

In one advantageous embodiment of the invention, the ash, the reaction product, and the unreacted $SO_2$ sorbent drawn off from the circulating fluidized-bed firing system and fed to the mixing unit is supplied to the mixing unit from the flue-gas filter as filter ash and from the combustion chamber as bottom ash over separate supply lines in each case, in which connection either filter ash or bottom ash or an adjustable mixture of the two can be fed to the mixing unit. This makes it possible to respond to any operational situation of the fluidized-bed firing system.

Furthermore the apportionment of the mixture of filter ash and bottom ash can be set by adjusting the grain sizes of added fuel and $SO_2$ sorbent.

It is advantageous to introduce the water or an aqueous, sodium-containing solution into the mixing unit by means of at least one nozzle. As the situation demands, the requisite nozzles can be installed within the mixing unit at any points desired.

It is advantageous to use limestone as the $SO_2$ sorbent. This is relatively inexpensive and has worked well as an $SO_2$ sorbent. Furthermore it may also be advantageous to use dolomite as the $SO_2$ sorbent.

In another advantageous embodiment of the invention, 50% to 500% of solid mixture, relative to the solid mixture normally leaving the combustion chamber of the fluidized-bed firing system, is fed to the mixing unit for the hydration process and subsequently fed again to the combustion chamber. Thereby an optimal conservation of the needed $SO_2$ sorbent is achieved.

In one special case of the procedure in accordance with the invention, a portion of the $SO_2$ sorbent is delivered directly to the mixing unit. In this way, regardless of the amount of ash in circulation as well as unreacted $SO_2$ sorbent, the requisite amount of $SO_2$ sorbent can be influenced from the outside.

In another special case of the procedure in accordance with the invention, a hydration product or $Ca(OH)_2$ can be delivered into the line between the mixing unit and combustion chamber, with it being advantageous for this product to be delivered upstream of an intermediate storage, as seen in the direction of flow of the product. In this way, this quantity of product can likewise be influenced from the outside.

If an aqueous, sodium-containing solution is used, it is advantageous for the solution to contain sodium in the form of ions on an order of magnitude of up to 3% by weight, relative to the unreacted $SO_2$ sorbent.

Furthermore it may be advantageous for the mixing unit to include an additional feed-in of water or of an aqueous, sodium-containing solution, by means of which water or an aqueous, sodium-containing solution is added to the ash, the reaction product, and the unreacted $SO_2$ sorbent upstream of the mixing unit. Thereby the reaction in the mixing unit can be influenced beforehand if appropriate.

Through the apparatus in accordance with the invention, the procedure in accordance with the invention can be carried out in an efficient, inexpensive, and resource-sparing manner.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
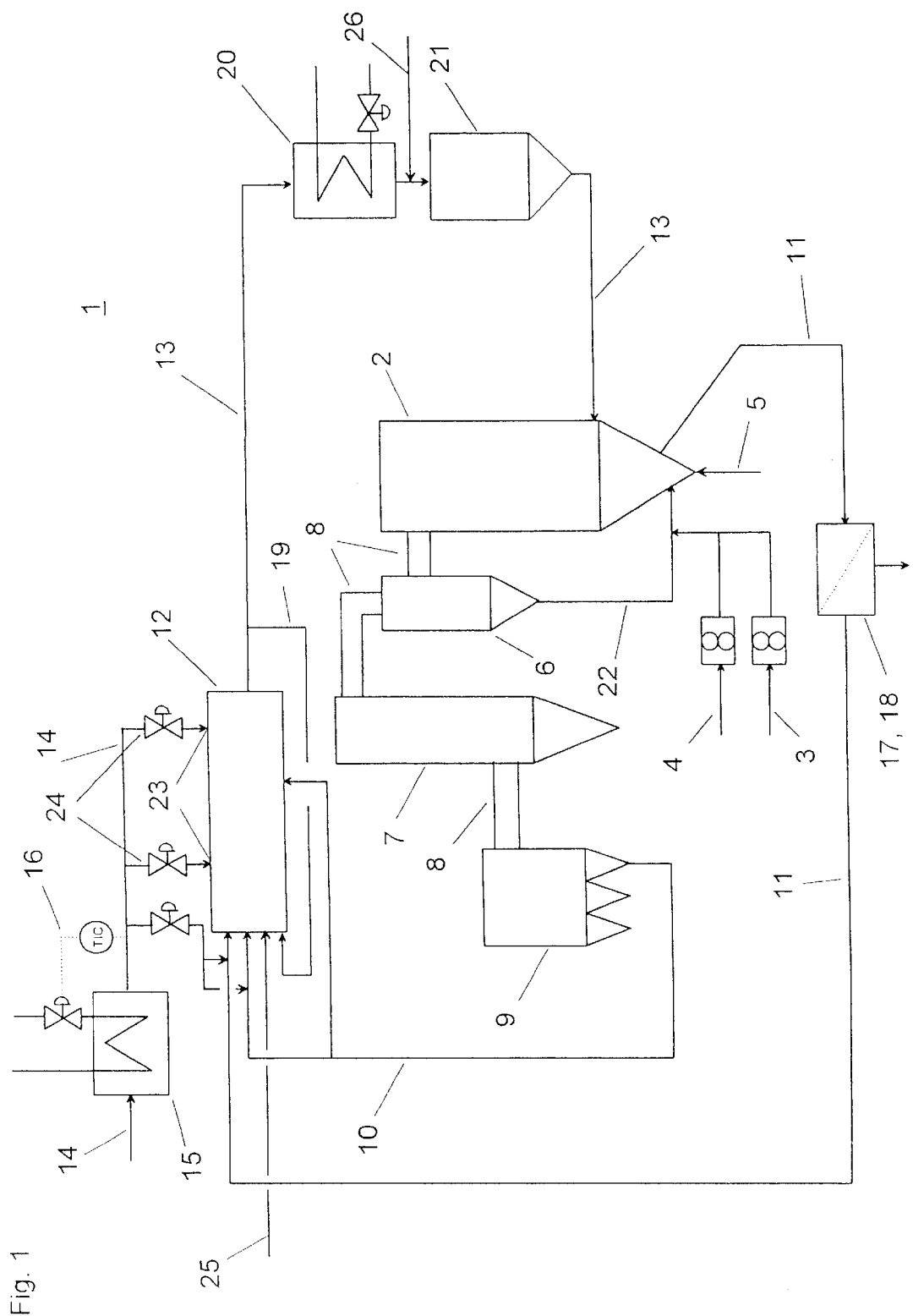
FIG. 1 is a schematic diagram of a first embodiment an apparatus for cleaning flue gas in accordance with the invention.

FIG. 1 shows in a schematic way the apparatus in accordance with the invention for the cleaning of flue gases containing sulfur dioxide that come from fluidized-bed firing systems. By means of the apparatus shown, the procedure in accordance with the invention can also be carried out.

The circulating fluidized-bed firing system 1 in accordance with the invention has a fluidized-bed combustion chamber 2, in which in a familiar manner coal or other particulate and carbon-containing fuels are burned by the addition of air—as a fluidizing medium via the line 5 as well as secondary air—at 700 to 950° C. in the fluidized bed. For the desulfurization of the sulfur-containing fuel, in addition to the fuel (supply line 3) also an $SO_2$ sorbent is delivered to the combustion chamber 2 via the line 4. As a rule, limestone in the form of particles or fine grains, namely $CaCO_3$, is delivered to the combustion chamber 2 as the $SO_2$ sorbent. In place of limestone, also dolomite as well as burnt lime (CaO) or $Ca(OH)_2$ can be used as an $SO_2$ sorbent.

When limestone is used as the $SO_2$ sorbent, first of all the process of roasting the limestone into burnt lime (CaO) takes place in the combustion chamber 2 and subsequently a reaction occurs between the roasted limestone and the sulfur dioxide of the flue gas that has arisen in the combustion of the sulfur-containing fuel. In the temperature that prevails in combustion chamber 2, carbon dioxide is expelled from the limestone and burnt lime remains behind, which because of the expulsion of the $CO_2$ is highly porous and thus has a high specific surface area. In the subsequent gas-solid reaction of the burnt lime as an $SO_2$ sorbent with sulfur dioxide and oxygen, the latter are adsorbed on the surface and in the pores of the sorbent, and gypsum ($CaSO_4$) remains behind as a reaction product. Here the above-mentioned high specific surface area of the $SO_2$ sorbent is extremely important to its having a high absorbing capacity or reactivity.

Depending on the grain size of the limestone or $SO_2$ sorbent used and its abrasion properties, either the sorbent-reaction product aggregate (lime-gypsum aggregate) remains in the combustion chamber until it is drawn off via the components or media 11 of the combustion-chamber ash removal system, or in the case of small particles the sorbent-reaction product aggregate leaves the combustion chamber 2 together with the flue-gas stream through the line 8, and after passing through a separator 6 (particles separated out in the separator 6 are recycled to the combustion chamber 2 through the line 22) and through a steam generator or heat-recovery adjuncts 7, to which a large portion of the heat contained in the flue gas is released, it is subsequently separated out in the following flue-gas filter 9.

Here the mixture of ash, reaction product or gypsum, and free, non-reacted limestone, which is drawn off via the combustion-chamber ash removal system, is usually designated as coarse or also as bottom ash, and the mixture that is separated out in filter 9 is designated as filter ash. In what follows, these designations are used for the above-mentioned mixtures.

The bottom ash and the filter ash thus arrive via two separate circuits—the bottom ash via the line 11 and the filter ash separated out from the flue gas in the flue-gas filter 9 via the line 8 (jointly with the flue gas) and line 10—from the combustion chamber 2 into a mechanical mixing unit 12. In this mixing unit 12, water is fed to the above-mentioned mixture through a supply line 14 and via at least one feed nozzle 23 for their mixing together. In case it is necessary, also a number of feed nozzles 23 can be positioned in the mixing unit 12 via the product-passage segment. The mixing unit 12 can furthermore include upstream of the mixing unit 12, in the line 10 and/or 11, another feed nozzle 23. By means of this nozzle, the mixing process can be influenced.

In accordance with the invention, the addition of water into the mixing unit 12 takes place at a reaction temperature of 60° C. to 100° C. and at atmospheric pressure (about 1 bar). In such a case the still free, namely unreacted burnt lime reacts within the framework of an exothermic reaction to form hydrated lime (hydration product), with the reaction rate and the temperature elevation depending on the free-lime concentration of the ash, the temperature of the added ash, as well as the temperature of the supplied water. Because of the lower density of hydrated lime compared to lime, the reaction causes the lime aggregate to swell, so that the gypsum blanket around the lime aggregate is broken up and the gypsum blanket becomes permeable, and thereby the porous surface of the lime aggregate regains at least partially its $SO_2$ sorbability.

Instead of water, also an aqueous, sodium-containing solution can be fed to the product mixture in the mixing unit 12. Due to the sodium contained in the solution, the surface temperature of the reaction product is lowered and on its surface a liquid phase forms, which improves the $SO_2$ sorbability of the reaction product in connection with the reaction of sodium with $SO_2$ ($Na_2SO_4$).

The requisite reaction temperature in the mixing unit 12 can be regulated, with it being advantageous for the water or the aqueous, sodium-containing solution fed to the mixing unit 12 through line 14 to be preheated in accordance with the required reaction temperature. This happens in a preheater 15 positioned in the line 14, which depending on the required reaction temperature in the mixing unit 12 is regulated by means of a heat regulating mechanism 16. It is furthermore possible to regulate the amount of water or aqueous, sodium-containing solution fed to the mixing unit 12 as a function of the residual moisture of the product to be carried off from the mixing unit 12. It is advantageous for this to take place by means of an appropriate driving of the regulating valves 24 that lie upstream, on the side of the flow media, of the nozzle or nozzles 23 positioned at the mixing unit 12.

With respect to the product to be carried off from the mixing unit 12, in order to achieve the degree of hydration for this that is within a requisite range, the dwell time of the product introduced into the mixing unit 12 can also be regulated. This can be done, for example, by regulating the speed of transport in the mixing unit 12. It is expedient for the minimum dwell time to amount to one minute for the product that is to be mixed together and is to undergo a reaction within the mixing unit 12 and possibly also within the subsequent delivery lines.

A return line 19 makes it possible for a portion of the product carried off from the mixing unit 12 to be delivered again to the mixing unit 12 for a further or a renewed reaction and thus this makes it possible to influence the dwell time as well.

In addition to the reaction in the mixing unit 12 that preferably proceeds under atmospheric pressure and at a reaction temperature of 60° C. to 100° C., the reaction within the mixing unit 12 can also be carried out under a higher pressure. For example, the reaction can be brought about under a pressure of 5 bars and a reaction temperature equal to or less than 151° C., namely just below the boiling temperature associated with this pressure. The mixing unit 12 is constructed to be pressure-tight to the extent adequate to the chosen pressure.

In one useful embodiment of the invention, plowshare or paddle mixers are used as the mixing unit 12 for mixing the product mixture together with the water or aqueous, sodium-containing solution. However, agitators can also be used, if appropriate.

In one embodiment of the invention, by feeding the coarse or bottom ash and the filter ash in two separate lines or circuits the proportion of the bottom ash or filter ash that is supplied each time can be varied. For example, five quantitative shares of ground ash and one quantitative share of filter ash can be fed to the mixing unit 12. This makes it possible to have an operating mode for the mixing unit 12 that can be coordinated with the quantities of bottom ash or filter ash arising from the combustion chamber 2.

Through the use of the procedure in accordance with the invention in a circulating fluidized-bed firing system its advantages become clear, since here we have a close regulation of the combustion-chamber temperature, a long dwell time for the solid particles that are to be burned and that are introduced as $SO_2$ sorbent, a high degree of gas/solid particle intermixing, and as a result of this a low Ca/S ratio.

Figure 2:
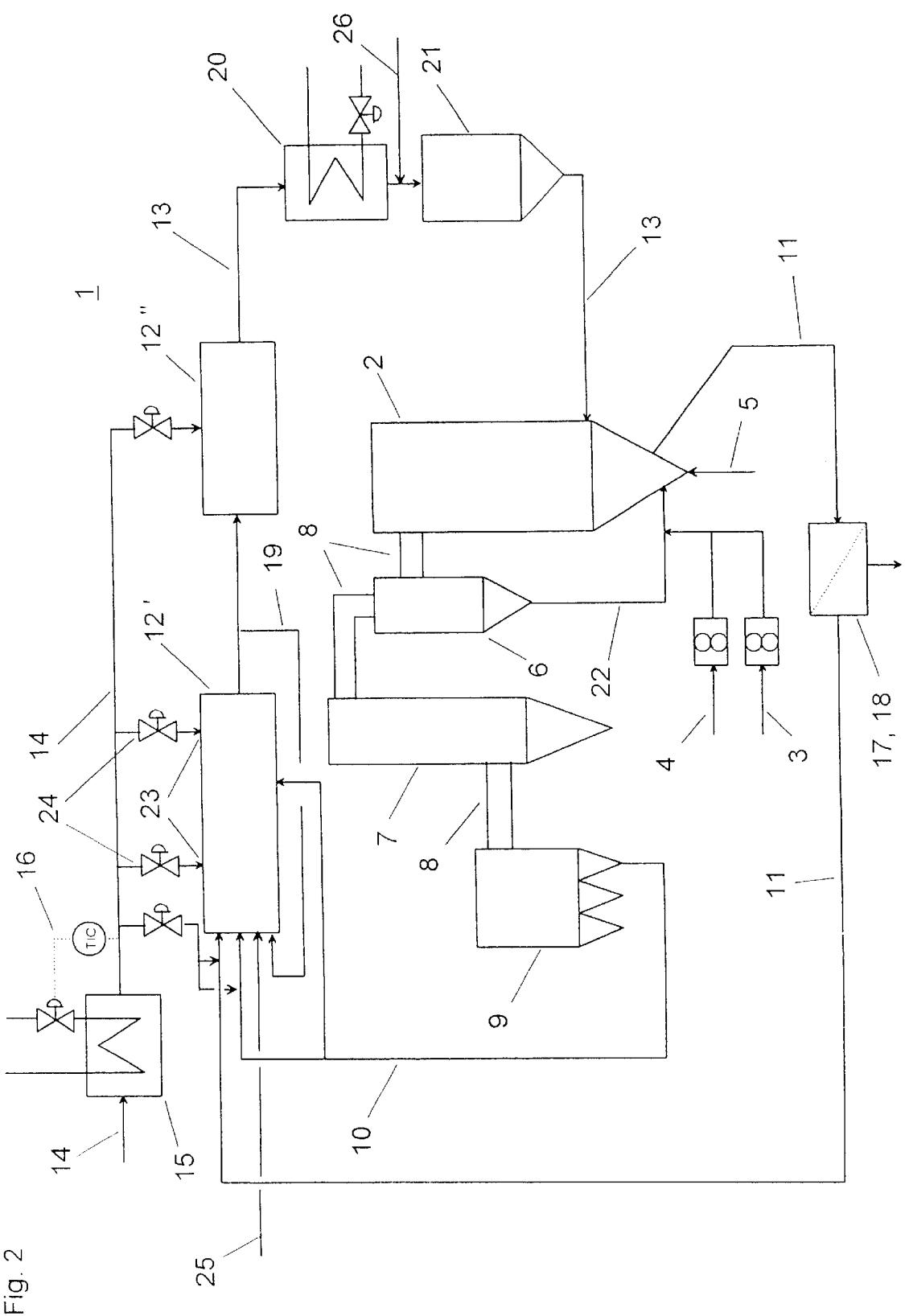
FIG. 2 is a schematic diagram of a first embodiment an apparatus for cleaning flue gas in accordance with the invention.

FIG. 2 shows a two-stage mixing unit 12, where in the first stage 12' a portion of the water or of an aqueous, sodium-containing solution required for the mixing is admixed with the ash, the gypsum aggregate, and the unreacted burnt lime, and in the second stage 12" subsequent to the first stage 12' the remaining portion of the water or of the aqueous sodium-containing solution is admixed in a regulated fashion as a function of the residual moisture of the product to be carried off from the mixing unit 12.

It is advantageous for the ash, the gypsum, and the hydration product carried off from the mixing unit 12 to exist in the form of a solid and to have a residual moisture of less than 10%. Furthermore the product carried off from the mixing unit 12 can be fed to a drier 20, in which the product can be dried, for example, into a product capable of being stored and if appropriate can be stored in an intermediate store 21 and can be fed to the fluidized-bed combustion chamber 2 after a certain interval of time.

By means of the line 13 the ash, the gypsum (reaction product) and the hydrated lime (hydration product) is fed from the mixing unit 12 to the combustion chamber 2, in which there occurs, because of the temperatures prevailing there, a counter-reaction and a splitting off of water vapor from the hydrated lime. Due to the thermal stress, additional cracking develops in the lime aggregate (reaction product), whereby the specific surface area is increased further. Due to the breaking up of the gypsum blanket as well as through the reaction surface additionally created by the swelling of the lime core, the lime that has not yet undergone a reaction in the interior of the previously blanketed or partially blanketed lime grains, namely the $SO_2$ sorbent, becomes available again for a more extensive desulfurization reaction.

The procedure in accordance with the invention is used especially efficiently when the concentration of non-reacted $SO_2$ sorbent in the combustion chamber 2 amounts to 5 to 40 percent by weight of the solid mixture carried off from the combustion chamber 2.

Before conducting the ash, the reaction product gypsum, and the unreacted lime into the mixing unit 12, this product can be sifted/sized and/or ground in units 17, 18 suitable for this purpose, in order to obtain the best possible conditions for the mixing process. In this connection it is expedient to use a sifter with a mesh width such that particles larger than 300 microns are sifted out and are separated out of the circuit. This has the advantage of preventing major erosions from occurring in the mixing unit 12 as well as the hydrating of stony materials.

The apparatus in accordance with the invention and the procedure in accordance with the invention allows either combustion-chamber bottom ash or filter ash or a mixture of the two to be fed to the mixing unit 12. In this connection, it is advantageous for the apportionment of the mixture of filter ash and bottom ash to be set by adjusting the grain sizes of added fuel and limestone.

In the procedure in accordance with the invention, there is a savings of 20% to 40% of $SO_2$ sorbent, for example limestone, as compared to previously familiar procedures. When compared to a customary sulfur retention of 95% and a customary Ca/S ratio (the ratio of $SO_2$ sorbent to sulfur that is to be retained) of 2, in the procedure in accordance with the invention and with a sulfur retention of 95% the result is a Ca/S ratio of 1.2. Thus this value already lies very close to the ideal stoichiometry of 1.0. With that, through the procedure in accordance with the invention considerably less $SO_2$ sorbent is needed for the retention of the sulfur present in the flue gas. This has a substantial effect on the operating costs of the system, especially when fuel having a high sulfur content is used.

The transporting of the product in the lines 10, 11, 13, or 19 can be done, for example, by either pneumatic or mechanical means.

The supply line 25 makes it possible to deliver more $SO_2$ sorbent to the mixing unit 12. Thereby, regardless of the concentration of unreacted $SO_2$ sorbent in the mixture delivered to the mixing unit 12, this mixture can be enriched by means of an externally supplied $SO_2$ sorbent. Likewise, by means of the line 26 the hydration product $Ca(OH)_2$ can be supplied to the line 13, which leads from the mixing unit 12 to the combustion chamber 2. By means of this measure, it is possible to influence the quantity of hydration medium, namely the medium that is reactivated again into an $SO_2$ sorbent in the combustion chamber 2.

In one advantageous embodiment of the invention, 50 to 500% by weight of the solid mixture, relative to the solid mixture that customarily leaves the combustion chamber 2 of the fluidized-bed firing system 1, is supplied to the mixing unit 2 for the hydration process and is subsequently supplied again to the combustion chamber 2.

In the procedure according to the invention, usually a continuous process is involved, but in special applications it is also possible to have a discontinuous mixing together and enrichment of the ash mixture with water in the mixing unit. In this case the hydration product is either discontinuously supplied to the combustion chamber 2 or the hydration product stored in an intermediate store 21 is continuously drawn off from this intermediate storage 21 and supplied to the combustion chamber 2.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Process for the cleaning of flue gases containing sulfur dioxide produced by sulfur-containing coal which is burned by the addition of air at a temperature of 700 to 950° C. in the combustion chamber of a circulating fluidized-bed firing system, the process comprising the steps of:

delivering a particulate $SO_2$ sorbent to the combustion chamber;

feeding a portion of the ash produced in the combustion and a portion of the reaction product produced in the reaction of the $SO_2$ sorbent with the sulfur dioxide as well as a portion of the unreacted $SO_2$ sorbent from the combustion chamber to a mechanical mixing unit;

supplying water or an aqueous sodium-containing solution to the mixing unit:

mixing the ash, the reaction product, the unreacted $SO_2$ sorbent together with the water or aqueous sodium-containing solution, whereby the unreacted $SO_2$ sorbent is converted into a hydration product at a reaction temperature of 60° C. to 100° and at atmospheric pressure;

regulating the reaction temperature of the mixing unit;

regulating the water or aqueous sodium-containing solution fed to the mixing unit as a function of the residual moisture of the hydration product to be carried off from the mixing unit;

regulating the dwell time of the products introduced into the mixing unit as a function of the degree of hydration of the product to be carried off;

returning the ash, the reaction product, and hydration product from the mixing unit into the combustion chamber of the fluidized-bed firing system; and reactivating the hydration product into an $SO_2$ sorbent at a combustion-chamber temperature of 700° to 950° C.

2. Process according to claim 1 further comprising the step of supplying water or an aqueous sodium-containing solution to the ash, the reaction product, and the unreacted $SO_2$ sorbent upstream of the mixing unit.

3. Process according to claim 1 wherein the step of regulating the reaction temperature of the mixing unit comprises the sub-step of preheating the water or the aqueous sodium-containing solution fed to the mixing unit.

4. Process according to claim 1 further comprising the step of maintaining a minimum dwell time of 1 minute in the mixing unit and the subsequent delivery lines for the products introduced into the mixing unit.

5. Process according to claim 1 wherein the mixing unit has first and second stages and the step of supplying water or an aqueous sodium-containing solution to the mixing unit comprises the sub-steps of:

mixing a first portion of the water or aqueous sodium-containing solution with the ash, the reaction product, and the unreacted $SO_2$ sorbent in the first stage of the mixing unit to form a mixture;

mixing a second portion of the water or aqueous sodium-containing solution with the mixture from the first stage of the mixing unit in the second state of the mixing unit; and regulating the mixing of the second portion of the water or aqueous sodium-containing solution with the mixture from the first stage of the mixing unit in the second state of the mixing unit as a function of the residual moisture of the product to be carried off from the mixing unit.

6. Process according to claim 1 wherein the ash, the reaction product, and the hydration product returned to the fluidized bed firing system from the mixing unit is in a solid form and has a residual moisture of less than 10%.

7. Process according to claim 6 wherein the step of returning the ash, the reaction product, and hydration product from the mixing unit comprises the sub-steps of:

feeding the ash, the reaction product, and hydration product from the mixing unit into a drier; and drying the ash, the reaction product, and hydration product into a product capable of being stored.

8. Process according to claim 7 wherein the step of returning the ash, the reaction product, and hydration product from the mixing unit further comprises the sub-steps of:

storing the ash, the reaction product, and the hydration product in an intermediate store; and feeding the ash, the reaction product, and the hydration product from the intermediate store to the fluidized-bed combustion chamber after a predetermined time interval.

9. Process according to claim 1 further comprising the step of feeding at least a portion of the ash, the reaction product, and the hydration product returned from the mixing unit back to the mixing unit.

10. Process according to claim 1 further comprising the step of sifting and sizing the ash, the reaction product, and the unreacted $SO_2$ sorbent before it is fed from the combustion chamber to the mixing unit.

11. Process according to claim 1 further comprising the step of grinding the ash, the reaction product, and the unreacted $SO_2$ sorbent before it is fed from the combustion chamber to the mixing unit.

12. Process according to claim 1 wherein the circulating fluidized-bed firing system also includes a flue-gas filter, a first supply line providing fluid communications between the mixing unit and the flue-gas filter, and a second supply line providing fluid communication between the mixing unit and the combustion chamber, and the step of feeding the ash, reaction product, and unreacted $SO_2$ sorbent comprises feeding an ash, reaction product, and unreacted $SO_2$ sorbent mixture selected from the group consisting of filter ash from the flue-gas filter, bottom ash from the combustion chamber, and an adjustable mixture of filter ash and bottom ash.

13. Process according to claim 12 further comprising the step of adjusting the grain sizes of added fuel and $SO_2$ sorbent to apportion the mixture of filter ash and bottom ash.

14. Process according to claim 1 wherein the water or aqueous sodium-containing solution is introduced into the mixing unit by way of at least one nozzle.

15. Process according to claim 1 wherein the concentration of non-reacted $SO_2$ sorbent in the combustion chamber is 5 to 40% by weight of the mixture of solids carried off from the combustion chamber.

16. Process according to claim 1 wherein limestone is used as the $SO_2$ sorbent.

17. Process according to claim 1 wherein dolomite is used as the $SO_2$ sorbent.

18. Process according to claim 1 wherein the aqueous sodium-containing solution contains sodium in the form of ions on an order of magnitude of up to 3% by weight, relative to the non-reacted $SO_2$ sorbent.

19. Process according to claim 1 further comprising the step of delivering at least a portion of the $SO_2$ sorbent directly to the mixing unit.

20. Process according to one claim 1 further comprising the step of delivering $Ca(OH)_2$ into the line between the mixing unit and combustion chamber.

21. Process according to claim 20 wherein $Ca(OH)_2$ is delivered upstream of an intermediate store, seen in the direction of flow of the product flowing in the line between the mixing unit and the combustion chamber.

22. Process according to claim 1 wherein 50 to 500% by weight of the mixture of solids, relative to the mixture of solids normally leaving the combustion chamber of the fluidized-bed firing system, is fed to the mixing unit for hydration and subsequently fed again to the combustion chamber.

* * * * *